Figure 1:
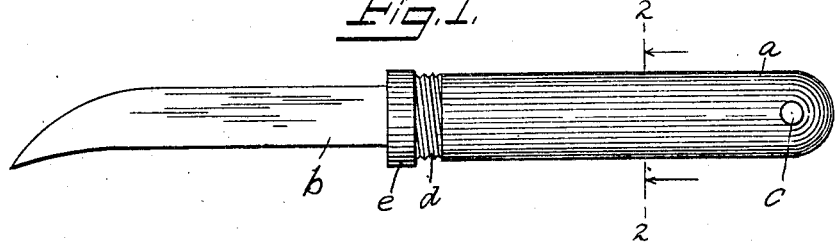

No. 871,416. PATENTED NOV. 19, 1907.
F. KLEEMANN.
SHOEMAKER'S KNIFE.
APPLICATION FILED FEB. 26, 1907.

WITNESSES
INVENTOR
Felix Kleemann.
BY
ATTORNEYS

UNITED STATES PATENT OFFICE.

FELIX KLEEMANN, OF LONDON, ENGLAND.

SHOEMAKER'S KNIFE.

No. 871,416.

Specification of Letters Patent.

Patented Nov. 19, 1907.

Application filed February 26, 1907. Serial No. 359,482.

*To all whom it may concern:*

Be it known that I, FELIX KLEEMANN, a subject of the King of Great Britain, and residing at London, E. C., in the county of Middlesex, England, have invented certain new and useful Improvements in Shoemakers' Knives, of which the following is a specification, such as will enable those skilled in the art to which it appertains to make and use the same.

This invention relates to knives of the class used by shoe and boot makers, and the object thereof is to provide an improved device of this class the blade of which is longitudinally adjustable in the handle so that the length of said blade may be increased or decreased at will; a further object being to provide a knife of the class described, the handle of which is composed of two parts and the shank of the blade of which is adapted to be secured between the separate parts of the handle in such manner as to be longitudinally adjustable in said handle.

The invention is fully disclosed in the following specification, of which the accompanying drawing forms a part, in which the separate parts of my improvement are designated by suitable reference characters in each of the views, and in which:—

Figure 2:
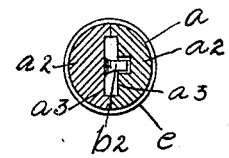
Figure 3:
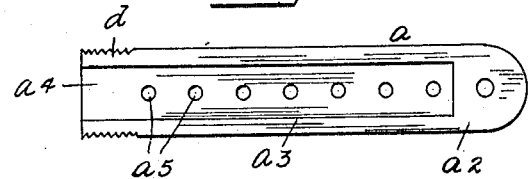
Figure 4:
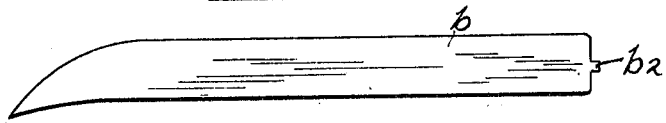
Figure 5:
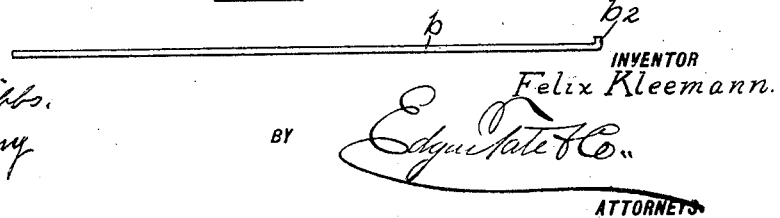

Figure 1 is a side view of my improved shoe maker's knife complete; Fig. 2 a cross section on the line 2—2 of Fig. 1; Fig. 3 an inside view of one part of the handle; Fig. 4 a side view of the blade removed from the handle; and, Fig. 5 a back view of the blade.

In the practice of my invention, I provide a knife handle $a$ having a blade $b$, and the handle $a$ is composed of two similar parts $a^2$, said parts being provided in their adjacent faces with longitudinal recesses $a^3$ forming a longitudinal chamber $a^4$ adapted to receive the shank of the blade $b$. In the longitudinal recess in one part $a^2$ of the handle are formed recesses or apertures $a^5$ and the end of the shank of the blade $b$ is provided with a laterally curved hook member $b^2$ adapted to enter one of said recesses. The separate parts of the handle $a$ are connected, opposite the end from which the blade projects, by a pivot or similar device $c$ on which said parts of the handle are free to turn, and the opposite end of the handle is provided with a thread $d$ on which, in practice, is placed a screw-threaded band $e$.

In connecting the blade with the handle, the band $e$ is detached, the separate parts of the handle are turned on the pivot $c$ and the shank of the blade is placed in the chamber $a^4$ formed by the longitudinal recesses $a^3$ in the separate parts of the handle and the hook member $b^2$ at the end of the shank is inserted into one of the holes or apertures $a^5$, after which the separate parts of the handle are swung into position and the band $e$ is screwed onto the end thereof as shown in Fig. 1 and this securely holds the blade in the handle.

It will be understood that the length of the projecting portion of the blade may be adjusted to any desired extent by simply adjusting the blade in the handle, in which operation the band $e$ must be taken off and the separate parts of the blade $b$ be adjusted as may be desired, after which the separate parts of the handle are again connected as shown in Fig. 1.

My invention is not limited to the particular form of handle herein shown and described, and various changes therein and modifications thereof may be made without departing from the spirit of my invention or sacrificing its advantages.

Having fully described my invention, what I claim as new and desire to secure by Letters Patent, is:—

A knife, the handle of which is composed of two similar parts provided with a longitudinal chamber, one part of the handle being provided with a plurality of longitudinally arranged holes, a blade the shank of which is adapted to fit in said chamber the end of which is provided with a hook member adapted to fit in said holes whereby the blade may be adjusted longitudinally of the handle, and means for securing the separate parts of the handle together.

In testimony that I claim the foregoing as my invention I have signed my name in presence of the subscribing witnesses this 15th day of February 1907.

FELIX KLEEMANN.

Witnesses:
 H. D. JAMESON,
 R. F. WILLIAMS.